United States Patent [19]
Nobuta et al.

[11] Patent Number: 5,713,213
[45] Date of Patent: Feb. 3, 1998

[54] REFRIGERATION CYCLE DEVICE HAVING ACCURATE REFRIGERANT DEFICIENCY DETECTION CAPABILITY

[75] Inventors: Tetsuji Nobuta, Kariya; Hisayoshi Sakakibara, Nishio, both of Japan

[73] Assignee: Denso Corporation, Kariya, Japan

[21] Appl. No.: 772,177

[22] Filed: Dec. 20, 1996

[30] Foreign Application Priority Data

Dec. 22, 1995 [JP] Japan .................. 7-335429

[51] Int. Cl.$^6$ .................................................. F25B 49/00
[52] U.S. Cl. .................. 62/126; 62/158; 62/129
[58] Field of Search .................. 62/129, 126, 125, 62/127, 157, 158, 227, 226

[56] References Cited

U.S. PATENT DOCUMENTS

| | | | |
|---|---|---|---|
| 4,829,777 | 5/1989 | Matsuoka et al. | 62/212 |
| 5,009,074 | 4/1991 | Goubeaux et al. | 62/126 X |
| 5,150,584 | 9/1992 | Tomasov et al. | 62/126 X |
| 5,243,829 | 9/1993 | Bessler | 62/158 X |
| 5,301,514 | 4/1994 | Bessler | 62/129 X |

FOREIGN PATENT DOCUMENTS 1-95255  4/1989  Japan .

*Primary Examiner*—Harry B. Tanner
*Attorney, Agent, or Firm*—Harness, Dickey & Pierce, PLC

[57] ABSTRACT

Deficiency in the amount of a refrigerant in a refrigeration cycle device is determined based on the amount of decrease in the temperature of an evaporator after a predetermined time period elapses since the actuation of a compressor. The execution of the process for determining deficiency in the amount of refrigerant is prohibited for predetermined time period after the deactivation of the compressor. Therefore, when the temperature of the evaporator does not increase enough after the compressor is actuated, erroneous determination that there is a deficiency in the refrigerant amount can be reliably prevented. In this way, deficiency in the amount of refrigerant in the refrigeration cycle can always be properly determined based on an amount of decrease in the temperature of the evaporator.

23 Claims, 4 Drawing Sheets

REFRIGERATION CYCLE DEVICE HAVING ACCURATE REFRIGERANT DEFICIENCY DETECTION CAPABILITY

CROSS REFERENCE TO RELATED APPLICATION

This application is based on and claims priority from Japanese Patent Application No. 7-335429, the contents of which are incorporated herein by reference.

BACKGROUND OF THE INVENTION

1. Field of the Invention

The present invention relates to a device for detecting deficiency in the amount of refrigerant in a device for forming a refrigeration cycle. In particular, the present invention relates to a device for forming the refrigeration cycle which is suitable for use in an automotive air conditioner.

2. Description of Related Art

Leakage of refrigerant contained inside a device for forming a refrigeration cycle (hereinafter also referred to as refrigeration cycle device) of, for example, a vehicular air conditioner may occur after years of use. The refrigerant may leak out from pipes, connectors and the like of the refrigeration cycle device. When such leakage causes a deficiency in the amount of refrigerant within the refrigeration cycle, lubricant oil that circulates within the refrigeration cycle may pile up in some parts of the refrigeration cycle which may disrupt the flow of lubricant oil to a compressor and thus cause compressor burnout.

In this connection, Japanese Patent Laid-Open Publication No. Hei 1-95255 discloses a method for detecting a deficiency in the amount of refrigerant in the refrigeration cycle device. This method determines that there is a deficiency in the amount of refrigerant in the refrigeration cycle if a difference between a temperature of an evaporator when a compressor is actuated and a temperature of the evaporator at the elapse of a predetermined time period after the actuation of the compressor is lesser than a predetermined value.

However, when the deficiency in the amount of refrigerant is determined based on the amount of decrease in the temperature of the evaporator after the actuation of the compressor as described above, the following problem occurs. For example, in the automotive air conditioner or the like, the formation of frost on the evaporator is often prevented by detecting the temperature of the evaporator, and by intermittently actuating and deactuating the compressor in accordance with the temperature of the evaporator. With the compressor being operated intermittently, because the temperature of the evaporator is already low when the compressor is actuated again, the amount of decrease in the temperature of the evaporator after the actuation of the compressor will be insignificant. Accordingly, deficiency in the amount of refrigerant is erroneously determined despite the fact that the amount of refrigerant is normal (i.e., there is no deficiency in the amount of refrigerant).

Furthermore, when the automotive air conditioner is deactuated completely and started again after only a short period of time, because the temperature of the evaporator might not have risen enough, the above-described problem also occurs for this case.

SUMMARY OF THE INVENTION

In view of the foregoing problems in the prior art in mind, it is a primary object of the present invention to provide a device for forming a refrigeration cycle which can accurately determine deficiency in the amount of its refrigerant based on a temperature of an evaporator even if a compressor is intermittently operated.

To achieve the above-mentioned object, one aspect of the present invention provides a refrigeration cycle device which includes a compressor, a condenser, a pressure reduction unit, an evaporator, a refrigerant pipe, a temperature detection unit, a temperature difference calculation unit, a refrigerant deficiency determination unit and an inhibition unit. The compressor is for compressing and discharging refrigerant. The condenser is for condensing the refrigerant discharged by the compressor. The pressure reduction unit is for reducing pressure of the refrigerant from the condenser. The evaporator is for evaporating the refrigerant. The refrigerant pipe is for guiding the refrigerant from the evaporator to the compressor. The temperature detection unit is for detecting the temperature of the evaporator. The temperature difference calculation unit is for calculating a temperature difference between a first temperature detected by the temperature detection unit at an actuation of the compressor and a second temperature detected by the temperature detection unit after a predetermined first time period has elapsed since the actuation of the compressor. The refrigerant deficiency determination unit is for determining a deficiency in the amount of the refrigerant based on the temperature difference calculated by the temperature difference calculation unit. The inhibition unit is for inhibiting the refrigerant deficiency determination unit from determining the deficiency in the amount of the refrigerant unless a predetermined condition is satisfied.

Preferably, the refrigerant deficiency determination unit determines the deficiency in the amount of the refrigerant when the temperature difference is less than a predetermined first value.

Preferably, the predetermined condition is one of a condition that a deactuation elapsed time since a deactuation of the compressor is more than a predetermined second time period and a condition that the first temperature of the evaporator as detected by the temperature detection unit and the temperature of the outside of the refrigeration cycle device differ by more than a second predetermined value. Here, the refrigeration cycle device is provided with an outside temperature detection unit for detecting Outside temperature.

In this way, even if the compressor is intermittently operated to prevent the formation of frost on the evaporator, determination of shortage in the amount of refrigerant can be performed by performing this refrigerant shortage determination after a sufficient time has passed since the deactuation of the compressor or after the temperature of the evaporator becomes proximate to that of the outside temperature. Thus, erroneous determination that there is shortage in the amount of refrigerant can be reliably prevented.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

Preferred embodiments of the present invention are hereinafter described with reference to the accompanying drawings.

Figure 1:
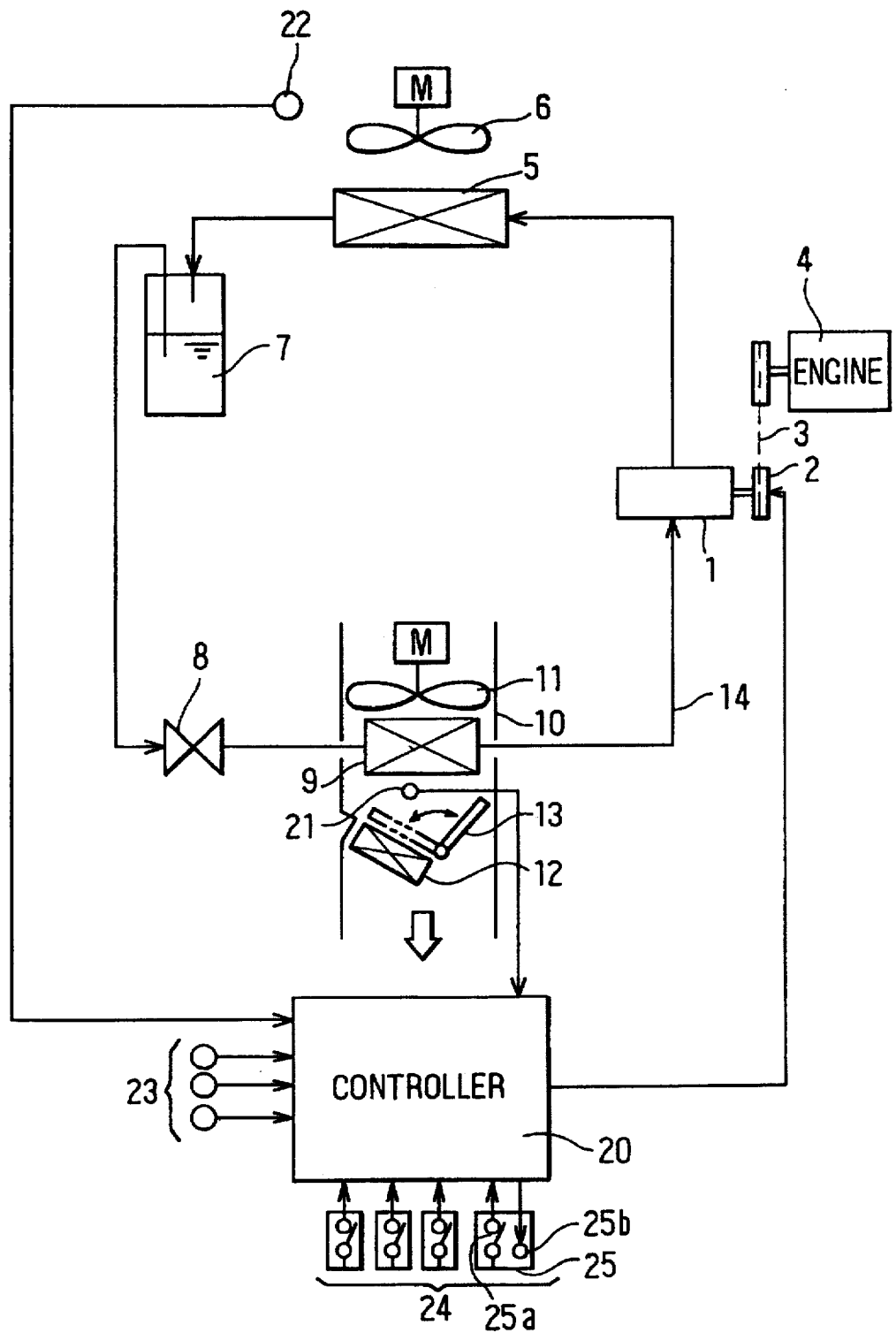
FIG. 1 is a schematic diagram of a refrigeration cycle device according to a first embodiment of the present invention.

FIG. 1 illustrates a refrigeration cycle device according to a first embodiment of the present invention. This refrigeration cycle device is used in an air conditioner of a vehicle. A compressor 1 of the refrigeration cycle device has an electromagnetic clutch 2 and is driven by an engine 4 of the vehicle when the electromagnetic clutch 2 is connected to the engine 4 via a belt 3.

The compressor 1 draws in refrigerant vapor (which is a vapor state of the refrigerant), compresses the refrigerant vapor and subsequently discharges the high temperature, highly pressurized superheated refrigerant vapor. The refrigerant vapor discharged by the compressor 1 flows into a condenser 5 where it condenses into a liquefied refrigerant (which is a liquid state of the refrigerant) after being cooled by an electric cooling fan 6. The refrigerant discharged from the condenser 5 flows into a receiver 7 which removes moisture from the liquefied refrigerant.

Upon leaving the receiver 7, the pressure of the liquefied refrigerant is reduced by a thermostatic expansion valve 8 which changes the liquefied refrigerant into a low temperature, low pressure liquid and gas mixture. This low temperature, low pressure mixture then flows into an evaporator 9. This evaporator 9, which is placed inside an air conditioning case 10 of the air conditioner, vaporizes the refrigerant by using heat extracted from inside or outside air blown by an electric air conditioning fan 11. The air from the electric air conditioning fan 11 is cooled and dehumidified to become cold air. This cold air is blown from a predetermined air outlet (not shown) into a passenger compartment of the vehicle after being reheated to a predetermined temperature by a heater core 12 with an engine coolant acting as a heat source. A temperature control door (air mixing door) 13 regulates the temperature of air discharged from the air outlet by adjusting the amount of heat applied by the heater core 12.

The refrigerant vapor coming from the evaporator 9 is taken in by the compressor 1 via a refrigerant intake passage 14. The aperture (which corresponds to the amount of refrigerant flow) of the thermostatic expansion valve 8 is adjusted in accordance with the temperature and the pressure of the refrigerant flowing out from the evaporator 9 so that the superheat degree of the refrigerant at a refrigerant outlet of the evaporator 9 is at a predetermined value.

Meanwhile, an air conditioner electronic controller 20, which includes a microprocessor and related circuits, controls an operation of the air conditioner following a predetermined program. A temperature sensor 21, which is made up of a thermistor or the like, is disposed in the vicinity of an air outlet of the evaporator 9 for detecting the temperature of air after passing through the evaporator 9. Aside from the detection of the deficiency in the amount of refrigerant, a detection signal of the temperature sensor 21 is also used for controlling refrigeration characteristics (frost prevention) of the evaporator 9 as will be described later.

In this way, the temperature sensor 21 is disposed at a position empirically determined to have the lowest temperature among positions in the vicinity of the air outlet of the evaporator 9. Because the temperature sensor 21 is for detecting the temperature of the evaporator 9, the temperature sensor 21 may be adhered to a fin or the like of the evaporator 9 to detect the surface temperature or the like of the fin.

An outside air temperature sensor 22 detects outside air temperature. This outside air temperature sensor 22 is disposed inside the engine compartment of the vehicle at a position where outside air can flow easily to the condenser 5. Air conditioner automatic control sensors 23 include a solar radiation sensor for detecting the amount of solar radiation, an internal air sensor for detecting the temperature of the passenger compartment of the vehicle, a temperature sensor for detecting the temperature of a coolant flowing into the heater core 12 and the like.

Furthermore, operation switches 24 for controlling air conditioning operations are disposed at an air conditioner control panel (not shown) provided in a dashboard at the front of the passenger compartment of the vehicle. These operation switches 24 set a target temperature, air blow mode, inside/outside air intake, air intake volume and the like. An air conditioning switch unit 25, which is one of the operation switches 24, has a switch 25a for generating an actuation signal of the compressor 1 and a lamp 25b for indicating the state of the switch 25a.

The lamp 25b is activated, for example, to blink on and off when there is a deficiency in the amount of refrigerant to indicate such deficiency to a passenger inside the passenger compartment of the vehicle. Other means may be used in place of the lamp 25b for indicating the deficiency in the amount of refrigerant.

Next, the operation of the above-described device is explained hereinafter. First of all, the controller 20 actuates the electromagnetic clutch 2. When the electromagnetic clutch 2 is connected to the belt 3, the engine 4 begins to drive the compressor 1 and the compressor 1 begins to take in and compress the refrigerant vapor. The refrigerant vapor discharged from the compressor 1 is cooled and condensed by the condenser 5.

The refrigerant flowing out from the condenser 5 is separated into refrigerant vapor and liquefied refrigerant by the receiver 7. The pressure of the liquefied refrigerant (saturated liquefied refrigerant) separated at the receiver 7 is reduced by the thermostatic expansion valve 8 to change the liquefied refrigerant into a gas and liquid mixture. The refrigerant is then vaporized by the evaporator 9 and the refrigerant vapor from the evaporator 9 is again drawn in by compressor 1 via the intake passage 14.

The temperature of blown air, which is being blown by the air conditioning fan 11, after passing through the evaporator 9 is detected by the temperature sensor 21 and when the detected temperature is less than a predetermined temperature (for example, 3° C.), the controller 20 deactuates the magnetic clutch 2 to stop the operation of the compressor 1. When temperature of air immediately after passing through the evaporator 9 rises up to a prescribed temperature (for example, 4° C.) due to the stoppage in the operation of the compressor 1, the controller 20 actuates the electromagnetic clutch 2 to start the operations of the compressor 1.

Thus, the formation of frost on the evaporator 9 is effectively prevented by actuating and deactuating the compressor 1 in accordance with the temperature of air that has just passed through the evaporator 9.

Figure 2:
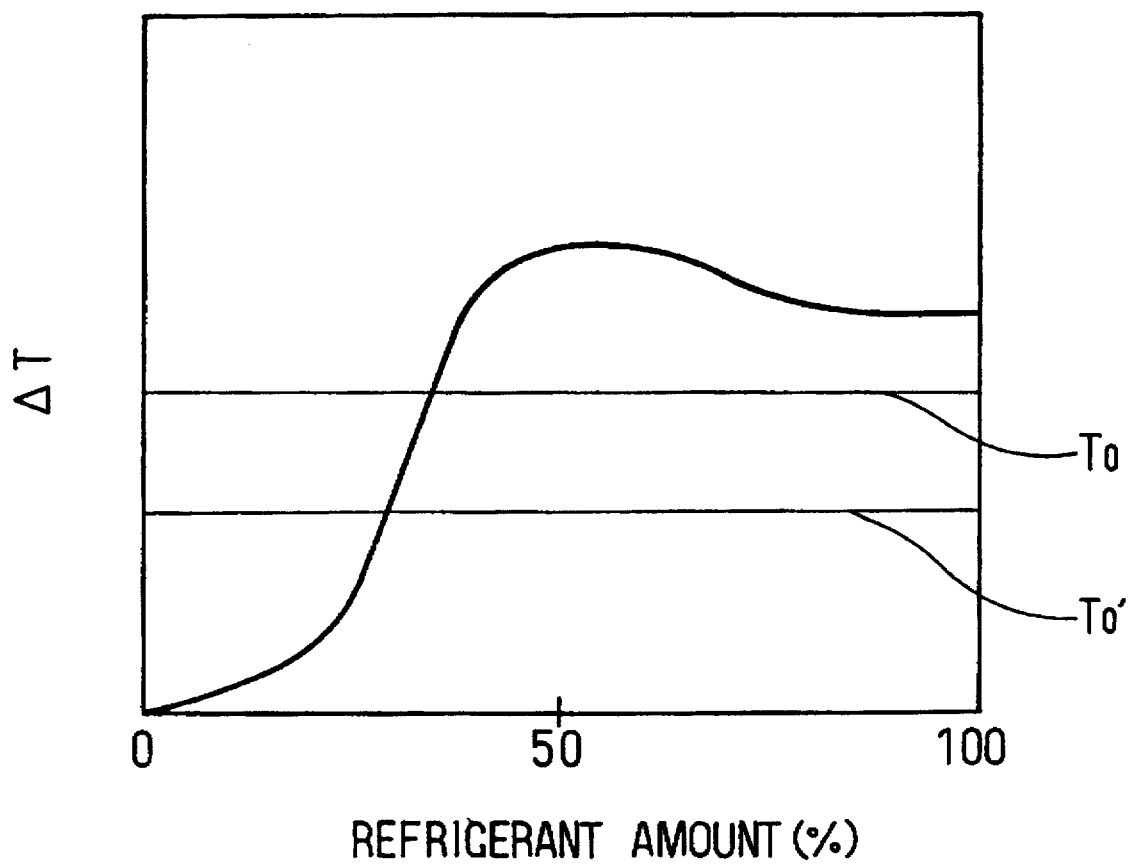
FIG. 2 is a graph illustrating a relation between the amount of decrease in the temperature of an evaporator and the amount of refrigerant after a compressor of the refrigeration cycle device is actuated.

In this refrigeration cycle device, a relation between the amount of refrigerant contained in the refrigeration cycle and the amount of decrease in the temperature of the evaporator 9 after actuating the compressor 1 is illustrated in FIG. 2. The initial amount of refrigerant contained in the refrigeration cycle device is set to 100%. Because of leaks and the like in the refrigeration cycle, the amount of refrigerant contained inside the refrigeration cycle decreases and becomes less than the initial amount with increasing usage. The amount of refrigerant may decrease to a level that is, for example, 50% of the initial amount. The decrease in the temperature of the evaporator 9 in FIG. 2 is indicated by a temperature difference $\Delta T$ between an evaporator temperature T1 (that is, the temperature measured by the temperature sensor 21) at the start of the operation of the compressor 1 and an evaporator temperature T2 at a point when a predetermined time period (which is one minute in this case) elapses after the start of the operations of compressor 1.

As shown in FIG. 2, the temperature difference $\Delta T$ (=T1–T2) gradually increases until the amount of refrigerant sealed in the refrigeration cycle is reduced to around 50% of the original amount. This increase in temperature difference $\Delta T$ is brought about by a decrease in the evaporator pressure due to a decrease in the amount of refrigerant which, in turn, lowers the evaporation temperature in the evaporator 9. When the refrigerant amount is further reduced to be less than 50% of the original amount, the temperature difference $\Delta T$ rapidly decreases because of the sharp deterioration in the refrigeration capacity of the evaporator 9 due to the rapid increase in the amount of superheated refrigerant vapor.

Therefore, in FIG. 2, a value T0 (which is, for example, set to 5.5° C.) for determining the deficiency of the refrigerant amount is set to be smaller than the temperature difference $\Delta T$ at the normal state when the refrigerant amount is 100%. Therefore, when the temperature difference $\Delta T$ is smaller than T0, the amount of the refrigerant sealed within the refrigeration cycle is determined to be deficient.

However, the compressor 1 is often stopped and started again intermittently to prevent the formation of frost in the evaporator 9 as described before. The compressor 1 is also intermittently operated when a passenger frequently actuates and deactuates the air conditioner of the vehicle. Under such condition in which the compressor 1 is often stopped and started again, because the temperature of the evaporator 9 when the compressor 1 is restarted remains low, the temperature difference $\Delta T$ (=T1–T2) can be smaller than the predetermined value T0 even when the amount of refrigerant is normal.

Therefore, in practical applications, the deficiency in the amount of refrigerant cannot be precisely and properly detected without considering the intermittent operation of the compressor 1.

Figure 3:
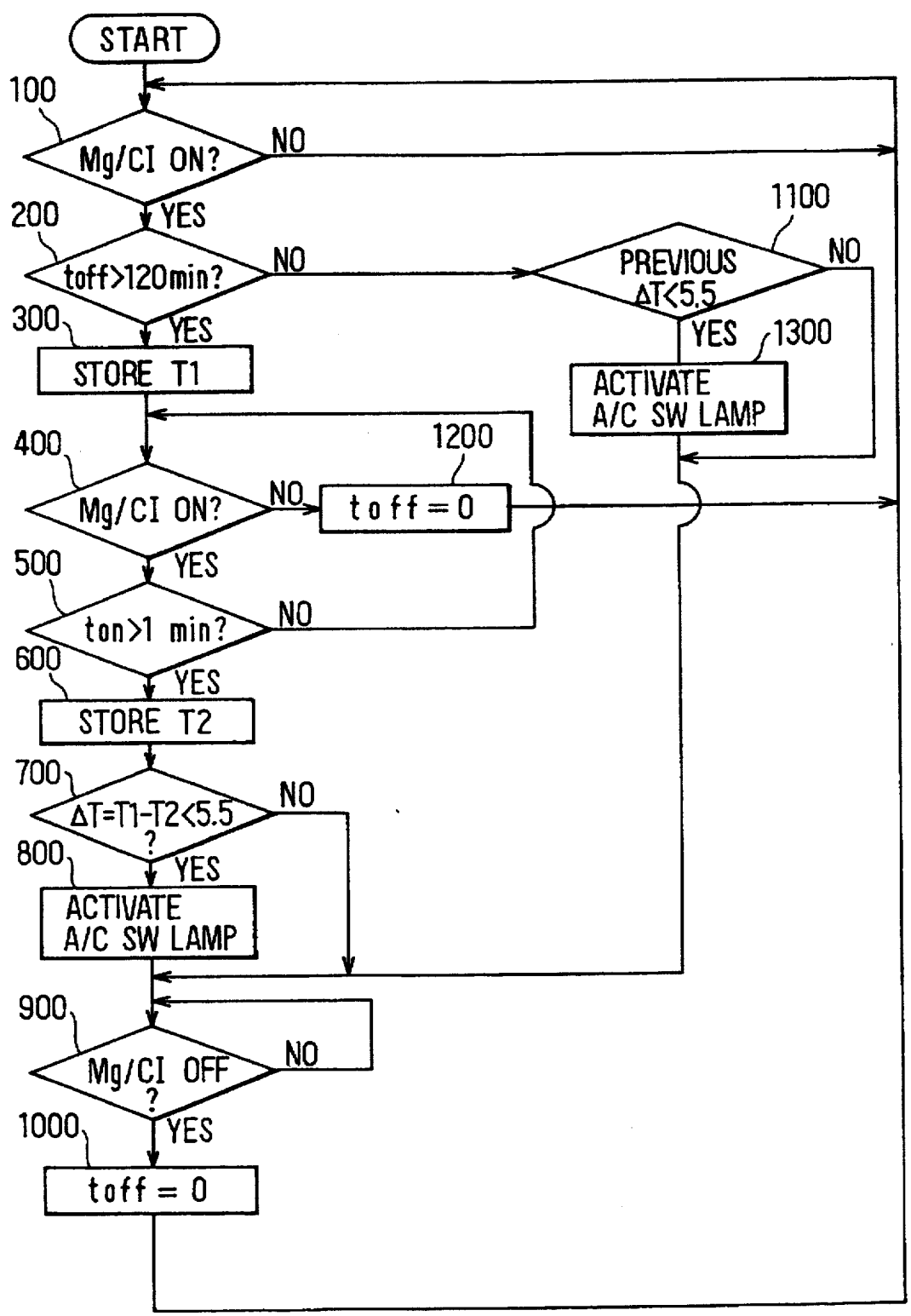
FIG. 3 is a flowchart illustrating an operation of the refrigeration cycle device according to the first embodiment.

Accordingly, the refrigeration cycle device of the present invention detects the deficiency in the amount of refrigerant in consideration of the intermittent operation of the compressor 1. FIG. 3 is a flowchart of a process for detecting the deficiency in the amount of refrigerant that is executed by the controller 20 of the refrigeration cycle device according to the present invention.

The controller 20 executes the process shown in FIG. 3 after it receives power from a power source battery provided in the vehicle. In this process, step 100 determines whether the compressor 1 is actuated or not (by detecting, for example, if the electromagnetic clutch 2 is actuated or not). When step 100 determines that the compressor 1 is operating, control goes to step 200 which determines whether an elapsed time toff since the previous stoppage of the compressor 1 has exceeded a predetermined time period (for example, 120 minutes).

When the elapsed time toff exceeds the predetermined time period, control proceeds to step 300 which stores the temperature T1 of the evaporator 9 at the start of the actuation of the compressor 1. Subsequent step 400 determines if the compressor 1 is actuated and when step 400 gives a positive output, control proceeds to step 500 which determines whether an elapsed time ton after the actuation of the compressor 1 exceeds a predetermined time period (for example, one minute).

When the elapsed time ton exceeds one minute, step 600 stores a temperature T2 which indicates the temperature of the evaporator 9 at the elapse of the predetermined time ton from the actuation of the compressor 1. Next, step 700 determines if the temperature difference $\Delta T$ (=T1–T2) between the evaporator temperatures T1 and T2 is smaller than the predetermined value T0 (which is, for example, set to 5.5° C.). When the temperature difference $\Delta T$ is smaller than the predetermined value T0, step 700 determines that there is a deficiency in the amount of refrigerant based on the graph of FIG. 2 and subsequent step 800 activates the lamp 25b of the air conditioning switch unit 25 to make the lamp 25b blink or the like to inform a passenger inside the passenger compartment of the vehicle of the deficiency in the amount of refrigerant.

When step 700 determines that the amount of refrigerant is normal based on the fact that the temperature difference $\Delta T$ is no less than the predetermined value T0, control skips over step 800 and directly proceeds to step 900. Step 900 determines whether the compressor 1 is at a stop (i.e., deactuated). When the compressor 1 is deactuated, step 1000 resets a timer for measuring the elapsed time toff and control returns to step 100.

Meanwhile, when the elapsed time toff after the compressor 1 is deactuated is no more than the predetermined time period (which is set here at 120 minutes), the temperature of the evaporator 9 has not risen to the temperature level of the passenger compartment and remains low. In this case, step 200 gives a negative output and control proceeds to step 1100 which determines whether the temperature difference $\Delta T$ at the previous actuation of the compressor 1 is smaller than the predetermined value T0. When the previous temperature difference $\Delta T$ is no less than the predetermined value T0, control proceeds to step 900 because the amount of refrigerant is determined to be normal. That is, control skips over steps 300 to 800 and goes directly to step 900.

Thus, the erroneous detection of the deficiency in the amount of refrigerant when the compressor 1 is actuated after only a short period of time following its deactuation can be prevented beforehand.

The compressor 1 is often intermittently operated (that is, actuated and deactuated) in accordance with the temperature of the evaporator 9 to prevent the formation of frost in the evaporator 9. However, even if the compressor 1 is operated intermittently, immediately after the deactuation of the compressor 1, control proceeds to step 1000 or to step 1200 following steps 400 or 900, respectively. Steps 1000 and 1200 reset the elapsed time toff to zero after the deactuation of the compressor 1 to prevent the erroneous detection of deficiency in the amount of refrigerant.

When the temperature difference $\Delta T$ at the previous actuation of the compressor 1 is smaller than the predetermined value T0, because there is a deficiency in the amount of refrigerant, step 1300 activates the lamp 25b of the air conditioning switch unit 25 to inform a passenger inside the passenger compartment of the vehicle of the refrigerant deficiency. Therefore, control can go directly to step 1300 without executing steps 300 to 800 which determine the deficiency of the refrigerant amount based on the amount of decrease in the temperature of the evaporator 9.

A second embodiment of the present invention is explained hereinafter. While step 200 in the first embodiment determines the length of the elapsed time toff after the deactuation of the compressor 1, step 200 may determine whether the temperature difference between the temperature of the evaporator 9 as detected by the temperature sensor 21 and an outside temperature detected by the outside air sensor 22 is no more than a prescribed value (for example, 1° C.). Then, if the temperature difference is greater than the prescribed value, the determination of deficiency in the amount of refrigerant based on the temperature of the evaporator 9 may be prohibited.

A third embodiment of the present invention is explained hereinafter. When the deficiency in the amount of refrigerant becomes acute, the compressor 1 may be deactuated because a decrease in the amount of lubricating oil returning to the compressor 1 may cause lubrication problems (i.e., burnout problems) in the compressor 1. For example, with reference to FIG. 2, when the temperature difference $\Delta T$ is smaller than the predetermined value T0, the deficiency in the refrigerant amount is indicated by activating the lamp 25b. In this third embodiment of the present invention, the lamp 25b is activated to indicate the deficiency in the amount of refrigerant and, at the same time, the compressor 1 is deactuated when the temperature difference $\Delta T$ of the evaporator 9 is smaller than another predetermined value T0', which is set to be smaller than T0.

Figure 4:
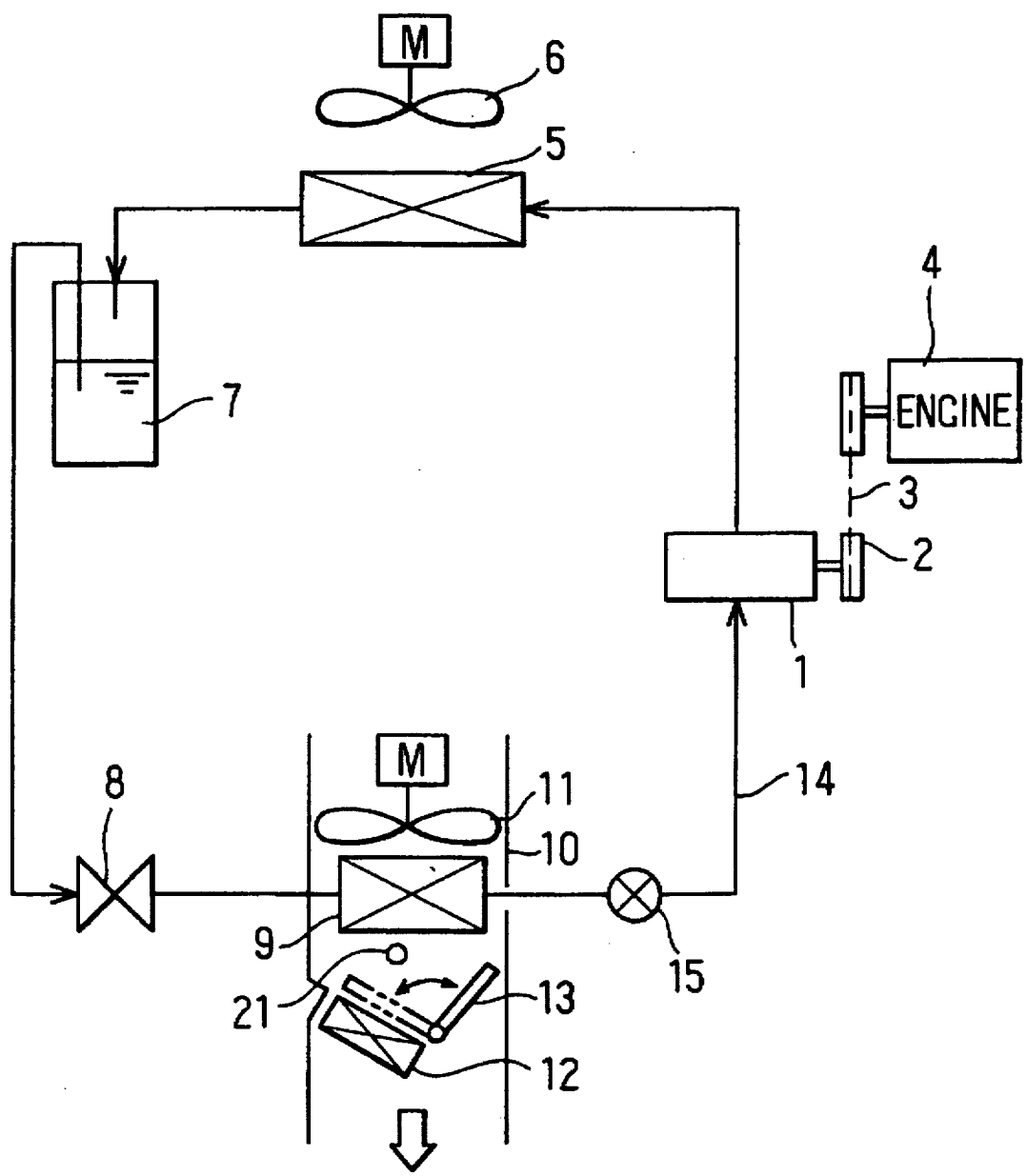
FIG. 4 is a schematic diagram of the refrigeration cycle device according to a fourth embodiment of the present invention.

A fourth embodiment of the present invention is explained hereinafter. In the refrigeration cycle of the first embodiment, the formation of frost on the evaporator 9 is prevented by intermittently controlling the operation of the compressor 1 in accordance with the evaporator temperature detected by the temperature sensor 21. Meanwhile, as shown in FIG. 4, an evaporator pressure adjustment valve 15 may be disposed at a refrigerant flow downstream side of the evaporator 9. This evaporator pressure adjustment valve 15 is used here for adjusting the aperture of the refrigerant passage connected to the downstream side outlet of the evaporator 9 to maintain the pressure of the evaporator 9 to be no less than a prescribed level and thus prevent the formation of frost on the evaporator 9.

Similarly, a variable capacity compressor whose refrigerant discharge capacity can be adjusted may be used as the compressor 1. In this system, the discharge capacity of the variable capacity compressor is adjusted in accordance with its refrigerant intake pressure (that is, pressure of the evaporator 9).

Although the present invention has been fully described in connection with preferred embodiments thereof with reference to the accompanying drawings, it is to be noted that various changes and modifications will become apparent to those skilled in the art.

In the flowchart in FIG. 3, although the determination of the deficiency of the refrigerant amount is performed by repeated execution of steps 300 through 700, it may be that the deficiency in the refrigerant amount is determined only once with the determination result that there is deficiency in the amount of refrigerant being maintained unconditionally so that the process for determining deficiency of refrigerant is not performed repeatedly.

Furthermore, in the refrigeration cycle of the first embodiment, although the compressor 1 is driven by the automotive engine 4, the present invention may be applied to a refrigeration cycle whose compressor 1 is driven by an electric motor.

Such changes and modifications are to be understood as being within the scope of the present invention as defined by the appended claims.

What is claimed is:

1. A refrigeration cycle device comprising:
   a compressor for compressing and discharging refrigerant;
   a condenser for condensing said refrigerant discharged by said compressor;
   pressure reduction means for reducing pressure of said refrigerant from said condenser;
   an evaporator for evaporating said refrigerant whose pressure is reduced by said pressure reduction means;
   a refrigerant pipe for guiding said refrigerant from said evaporator to said compressor;
   temperature detection means for detecting the temperature of said evaporator;
   temperature difference calculation means for calculating a temperature difference between a first temperature detected by said temperature detection means at an actuation of said compressor and a second temperature detected by said temperature detection means after a predetermined first time period has elapsed since said actuation of said compressor;
   refrigerant deficiency determination means for determining a deficiency in the amount of said refrigerant based on said temperature difference calculated by said temperature difference calculation means; and
   inhibition means for inhibiting said refrigerant deficiency determination means from determining said deficiency in the amount of said refrigerant unless a predetermined condition is satisfied.

2. A refrigeration cycle device according to claim 1, wherein said refrigerant deficiency determination means determines said deficiency in the amount of said refrigerant when said temperature difference is less than a predetermined first value.

3. A refrigeration cycle device according to claim 2, wherein said predetermined condition is a condition that a deactuation elapsed time since a deactuation of said compressor is more than a predetermined second time period.

4. A refrigeration cycle device according to claim 3, said device further comprising refrigerant deficiency indication means for indicating said deficiency in the amount of said refrigerant when said refrigerant deficiency determination means determines said deficiency in the amount of said refrigerant.

5. A refrigeration cycle device according to claim 4, said device further comprising control means for actuating and deactuating said compressor based on the temperature of said evaporator, said control means being for deactuating said compressor when said refrigerant deficiency determination means determines said deficiency in the amount of said refrigerant.

6. A refrigeration cycle device according to claim 5, said device further comprising timing means for measuring said deactuation elapsed time since said deactuation of said compressor, said timing means being for resetting when said control means deactuates said compressor.

7. A refrigeration cycle device according to claim 2, said device further comprising an outside temperature detection means for detecting outside temperature, wherein said predetermined condition is a condition that said first temperature of said evaporator and said outside temperature detected by said outside temperature detection means differ by more than a predetermined second value.

8. A refrigeration cycle device according to claim 7, said device further comprising refrigerant deficiency indication means for indicating said deficiency in the amount of said refrigerant when said refrigerant deficiency determination means determines said deficiency in the amount of said refrigerant.

9. A refrigeration cycle device according to claim 8, said device further comprising control means for actuating and deactuating said compressor based on the temperature of said evaporator, said control means being for deactuating said compressor when said refrigerant deficiency determination means determines said deficiency in the amount of said refrigerant.

10. A refrigeration cycle device according to claim 9, said device further comprising timing means for measuring said deactuation elapsed time since said deactuation of said compressor, said timing means being for resetting when said control means deactuates said compressor.

11. A refrigeration cycle device according to claim 1, wherein said refrigerant deficiency determination means is further for determining said deficiency in the amount of said refrigerant based on a previous value of said temperature difference calculated by said temperature difference calculation means.

12. A refrigeration cycle device according to claim 1, wherein said predetermined condition is a condition that a deactuation elapsed time since a deactuation of said compressor is more than a predetermined second time period.

13. A refrigeration cycle device according to claim 12, wherein said refrigerant deficiency determination means is further for determining said deficiency in the amount of said refrigerant based on a previous value of said temperature difference calculated by said temperature difference calculation means.

14. A refrigeration cycle device according to claim 1, said device further comprising an outside temperature detection means for detecting outside temperature, wherein said predetermined condition is a condition that said first temperature of said evaporator and said outside temperature detected by said outside temperature detection means differ by more than a predetermined second value.

15. A refrigeration cycle device according to claim 14, wherein said refrigerant deficiency determination means is further for determining said deficiency in the amount of said refrigerant based on a previous value of said temperature difference Calculated by said temperature difference calculation means.

16. An air conditioning device for cooling a vehicle having a passenger compartment, said device comprising:

a compressor for compressing and discharging refrigerant;

a condenser for condensing said refrigerant discharged by said compressor;

pressure reduction means for reducing pressure of said refrigerant from said condenser;

blowing means for blowing air towards said passenger compartment;

an evaporator for cooling said air to be blown by said blowing means by absorbing heat from said air to evaporate said refrigerant whose pressure is reduced by said pressure reduction means;

a refrigerant pipe for guiding said refrigerant from said evaporator to said compressor;

temperature detection means for detecting the temperature of said evaporator;

temperature difference calculation means for calculating a temperature difference between a first temperature detected by said temperature detection means at an actuation of said compressor and a second temperature detected by said temperature detection means after a predetermined first time period has elapsed since said actuation of said compressor;

refrigerant deficiency determination means for determining a deficiency in the amount of said refrigerant based on said temperature difference calculated by said temperature difference calculation means; and inhibition means for inhibiting said refrigerant deficiency determination means from determining said deficiency in the amount of said refrigerant unless a predetermined condition is satisfied.

17. An air conditioning device according to claim 16, wherein said refrigerant deficiency determination means determines said deficiency in the amount of said refrigerant when said temperature difference is less than a predetermined first value.

18. An air conditioning device according to claim 17, wherein said predetermined condition is a condition that a deactuation elapsed time since a deactuation of said compressor is more than a predetermined second time period.

19. An air conditioning device according to claim 18, said device further comprising timing means for measuring said deactuation elapsed time since said deactuation of said compressor, said timing means being for resetting when said control means deactuates said compressor.

20. An air conditioning device according to claim 18, said device further comprising control means for actuating and deactuating said compressor based on the temperature of said evaporator, said control means being for deactuating said compressor when said refrigerant deficiency determination means determines said deficiency in the amount of said refrigerant.

21. An air conditioning device according to claim 17, said device further comprising an outside temperature detection means for detecting outside temperature, wherein said predetermined condition is a condition that said first temperature of said evaporator and said outside temperature detected by said outside temperature detection means differ by more than a predetermined second value.

22. An air conditioning device according to claim 21, said device further comprising control means for actuating and deactuating said compressor based on the temperature of said evaporator, said control means being for deactuating said compressor when said refrigerant deficiency determination means determines said deficiency in the amount of said refrigerant.

23. An air conditioning device according to claim 17, wherein said refrigerant deficiency determination means is further for determining said deficiency in the amount of said refrigerant based on a previous value of said temperature difference calculated by said temperature difference calculation means.

* * * * *